(12) United States Patent
Nakao et al.

(10) Patent No.: US 11,329,513 B2
(45) Date of Patent: May 10, 2022

(54) CONTACTLESS POWER TRANSMISSION APPARATUS

(71) Applicant: OMRON Corporation, Kyoto (JP)

(72) Inventors: Goro Nakao, Inazawa (JP); Yusuke Kawai, Ichinomiya (JP); Atsushi Nomura, Ichinomiya (JP); Toshiyuki Zaitsu, Yokohama (JP); Takeshi Uematsu, Tokyo (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/049,038

(22) PCT Filed: Feb. 1, 2019

(86) PCT No.: PCT/JP2019/003708
§ 371 (c)(1),
(2) Date: Oct. 20, 2020

(87) PCT Pub. No.: WO2019/230052
PCT Pub. Date: Dec. 5, 2019

(65) Prior Publication Data
US 2021/0044151 A1 Feb. 11, 2021

(30) Foreign Application Priority Data

May 29, 2018 (JP) .............................. JP2018-102568

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC ................................. H02J 50/12; H02J 50/80
(Continued)

(56) References Cited

U.S. PATENT DOCUMENTS

2011/0127846 A1 6/2011 Urano
2012/0043825 A1 2/2012 Urano
(Continued)

FOREIGN PATENT DOCUMENTS

JP    H11-298368 A    10/1999
JP    2011-139621 A    7/2011
(Continued)

OTHER PUBLICATIONS

Watanabe et al., "Bidirectional contactless power transfer system expandable from unidirectional systems", IEEJ Transactions on Industry Applications, 2013, pp. 707-713, vol. 133, No. 7, The Institute of Electrical Engineers of Japan Concise explanation of relevance provided in the specification.
(Continued)

*Primary Examiner* — William Hernandez
(74) *Attorney, Agent, or Firm* — Metrolex IP Law Group, PLLC

(57) ABSTRACT

A contactless power transmission apparatus includes a transmitter that includes a transmitter coil that supplies electric power to a receiver and a power supply circuit that supplies alternating current power to the transmitter coil. The receiver includes a resonant circuit including a receiver coil that receives electric power from the transmitter and a resonant capacitor connected in series to the receiver coil, a rectifier circuit that rectifies electric power output from the resonant circuit, and a coil connected in parallel to the resonant circuit between the resonant circuit and the rectifier circuit.

4 Claims, 8 Drawing Sheets

(58) Field of Classification Search
USPC .......................................................... 307/104
See application file for complete search history.

(56) References Cited

U.S. PATENT DOCUMENTS

| | | | |
|---|---|---|---|
| 2016/0056639 A1* | 2/2016 | Mao ........................ | H02J 50/10 |
| | | | 307/104 |
| 2016/0079951 A1 | 3/2016 | Oosumi et al. | |
| 2017/0288463 A1* | 10/2017 | Nakahara ................ | H02J 50/40 |
| 2018/0331576 A1* | 11/2018 | Kikuchi .................. | H02J 50/05 |

FOREIGN PATENT DOCUMENTS

| | | |
|---|---|---|
| JP | 2015-42051 A | 3/2015 |
| WO | 2014/174783 A1 | 10/2014 |

OTHER PUBLICATIONS

An English translation of the International Search Report ("ISR") of PCT/JP2019/003708 dated Mar. 12, 2019.
The Written Opinion("WO") of PCT/JP2019/003708 dated Mar. 12, 2019.
Office Action (JPOA) dated Mar. 8, 2022 in a counterpart Japanese patent application.

* cited by examiner

| Degree of coupling | Set frequency (kHz) | $V_{in}$ | Output voltage (V) | |
|---|---|---|---|---|
| | | | $R_o = 10\,\Omega$ | $R_o = 1\,k\Omega$ |
| 0.15 | 86 | $V_{in}$ | 44.45 | 44.44 |
| 0.3 | 89.4 | $0.5 V_{in}$ | 44.40 | 46.33 |
| 0.6 | 106.6 | $0.25 V_{in}$ | 44.26 | 49.08 |

Fig. 6

| Degree of coupling | Set frequency (kHz) | $V_{in}$ | Output voltage (V) | |
| --- | --- | --- | --- | --- |
| | | | $R_o = 10\ \Omega$ | $R_o = 1\ k\Omega$ |
| 0.15 | 86 | $V_{in}$ | 44.1 | 57.99 |
| 0.3 | 89.4 | $0.5V_{in}$ | 44.39 | 58.17 |
| 0.6 | 106.6 | $0.25V_{in}$ | 44.26 | 58.21 |

CONTACTLESS POWER TRANSMISSION APPARATUS

FIELD

The present invention relates to a contactless power transmission apparatus.

BACKGROUND

Techniques have been studied for contactless power transmission (also called as wireless power transmission) or transmitting electric power through space without using metal contacts or other connections.

A known contactless power transmission technique is to transmit power by electromagnetic induction. A technique for supplying power by electromagnetic induction may use primary series-secondary parallel capacitors (hereafter, SP topology) (refer to, for example, Non-Patent Literature 1). With the SP topology, a capacitor is connected in series to a transmitter coil serving as a part of a transformer on the primary end (transmitter) and another capacitor is connected in parallel to a receiver coil serving as another part of the transformer on the secondary end (receiver).

With the SP topology, a resonant circuit including the receiver coil and the capacitor in the receiver causes parallel resonance and outputs a constant current.

With the SP topology, a reactor may be connected in series to the coil in the resonant circuit in the receiver (refer to, for example, Non-Patent Literature 1 and Patent Literature 1). This technique may be called an SPL topology. A contactless power transmission apparatus using the SPL topology reduces harmonic components in the transmitted power to provide ideal transformer response, thus increasing the power factor and improving power transmission efficiency.

CITATION LIST

Patent Literature

Patent Literature 1: Japanese Unexamined Patent Application Publication No. 2015-42051

Non-Patent Literature

Non-Patent Literature 1: Watanabe et al., "Bidirectional contactless power transfer system expandable from unidirectional systems", IEEJ Transactions D, IEEJ Transactions on Industry Applications, Vol. 133, No. 7, pp. 707-713, 2013

SUMMARY

Technical Problem

Electronic devices are typically controlled with a constant voltage. Thus, contactless power transmission apparatuses may output a constant voltage from the receivers. A contactless power transmission apparatus including primary series and secondary series capacitors (hereafter, SS topology) is also studied to output a constant voltage from the receiver. With the SS topology, a capacitor is connected in series to a transmitter coil serving as a part of a transformer in the transmitter and another capacitor is connected in series to a receiver coil serving as another part of the transformer in the receiver.

However, the SS topology may not sufficiently reduce fluctuations in the voltage output from a device in the receiver resulting from load fluctuations in a load circuit connected to a device in the receiver.

One or more aspects of the present invention are directed to a contactless power transmission apparatus that reduces fluctuations in an output voltage resulting from load fluctuations in a load circuit connected to a device in the receiver.

Solution to Problem

A contactless power transmission apparatus according to one aspect of the present invention includes a transmitter and a receiver that receives electric power from the transmitter in a contactless manner. In the contactless power transmission apparatus, the transmitter includes a transmitter coil that supplies electric power to the receiver and a power supply circuit that supplies alternating current power to the transmitter coil. The receiver includes a resonant circuit including a receiver coil that receives electric power from the transmitter and a resonant capacitor connected in series to the receiver coil, a rectifier circuit that rectifies electric power output from the resonant circuit, and a coil connected in parallel to the resonant circuit between the resonant circuit and the rectifier circuit.

The contactless power transmission apparatus with the above structure reduces fluctuations in the output voltage resulting from load fluctuations in a load circuit connected to a device in the receiver.

In the contactless power transmission apparatus, the power supply circuit in the transmitter may adjust a switching frequency and a voltage of alternating current power supplied to the transmitter coil. The transmitter may further include a first communicator that receives, from the receiver, a signal including determination information indicating whether the contactless power transmission apparatus is in a constant voltage output operation and whether an output voltage of the resonant circuit is within a predetermined allowable range of voltages, and a control circuit that controls, in accordance with the determination information, the switching frequency and the voltage of the alternating current power supplied to the transmitter coil from the power supply circuit. The receiver may further include a voltage detection circuit that measures the output voltage of electric power output from the resonant circuit and determines a measurement value of the output voltage, a constant voltage determination circuit that determines, based on the measurement value of the output voltage, whether the contactless power transmission apparatus is in the constant voltage output operation and whether the measurement value is within the predetermined allowable range of voltages, and a second communicator that transmits, to the transmitter, the signal including the determination information indicating whether the contactless power transmission apparatus is in the constant voltage output operation and whether the measurement value is within the predetermined allowable range of voltages.

The contactless power transmission apparatus with the above structure can continue a constant voltage output operation at a varying degree of coupling between the transmitter coil and the receiver coil.

In the above contactless power transmission apparatus, the control circuit in the transmitter may control, in response to the determination information indicating that the contactless power transmission apparatus is not in the constant voltage output operation, the switching frequency of the alternating current power supplied to the transmitter coil from the power supply circuit to allow the measurement value of the output voltage to be unchanged for a varying resistance of a load circuit connected to the rectifier circuit in the receiver.

The contactless power transmission apparatus with the above structure can correctly detect the frequency of AC power applied to the transmitter coil for enabling a constant voltage output operation.

In the above contactless power transmission apparatus, the control circuit in the transmitter may control the voltage of the alternating current power supplied to the transmitter coil from the power supply circuit to cause the measurement value of the output voltage to be within the predetermined allowable range of voltages in response to the determination information indicating that the contactless power transmission apparatus is in the constant voltage output operation and the measurement value of the output voltage is out of the predetermined allowable range of voltages.

The contactless power transmission apparatus with the above structure can output a constant voltage from the resonant circuit in the receiver at variable degrees of coupling between the transmitter coil and the receiver coil.

In the contactless power transmission apparatus, the receiver may further include a second coil connected in parallel to the resonant circuit between the resonant circuit and the rectifier circuit and a short-circuiting circuit switchable between short-circuiting or opening the second coil. In this contactless power transmission apparatus, the constant voltage determination circuit may receive, from the transmitter through the second communicator, the switching frequency of the alternating current power supplied to the transmitter coil from the power supply circuit when the contactless power transmission apparatus is in the constant voltage output operation, and control the short-circuiting circuit in accordance with the switching frequency.

The contactless power transmission apparatus with the above structure can efficiently reduce fluctuations in the output voltage resulting from load fluctuations in a load circuit connected to a device in the receiver at a varying degree of coupling between the transmitter coil and the receiver coil.

BRIEF DESCRIPTION OF THE DRAWINGS

FIG. 6 is a table showing, as a comparative example eliminating a coil between a resonant circuit and a rectifier-smoothing circuit, the relationship between the resistance of the load circuit and the output voltage for each degree of coupling in the simulation in FIG. 4 at a switching frequency enabling a constant voltage output operation.

DETAILED DESCRIPTION

A contactless power transmission apparatus according to one embodiment of the present invention will now be described with reference to the drawings. The inventors have noticed that a contactless power transmission apparatus using primary series and secondary series capacitors (SS topology) may not sufficiently reduce fluctuations in a voltage of alternating current (AC) power output from a resonant circuit in the receiver (hereafter simply referred to as an output voltage) against load fluctuations in a load circuit when the AC power output from the resonant circuit is rectified by a rectifier circuit before supplied to the load circuit. The inventors have then found that fluctuations in the output voltage result from the parasitic capacitance of diodes included in the rectifier circuit.

In this contactless power transmission apparatus, the receiver may include a coil connected in parallel to the resonant circuit between the rectifier circuit and the resonant circuit including a receiver coil and a resonant capacitor to produce series resonance. The contactless power transmission apparatus thus reduces the parasitic capacitance of the diodes in the rectifier circuit affecting the resonance with the transmitted power, thus reducing fluctuations in the output voltage resulting from load fluctuations in a load circuit.

A constant voltage output operation herein refers to an operation of the contactless power transmission apparatus in which fluctuations in the output voltage are within an allowable range (e.g., a range corresponding to ±10% of a predetermined reference voltage) in accordance with, for example, the specifications of a load circuit connected to the contactless power transmission apparatus.

Figure 1:
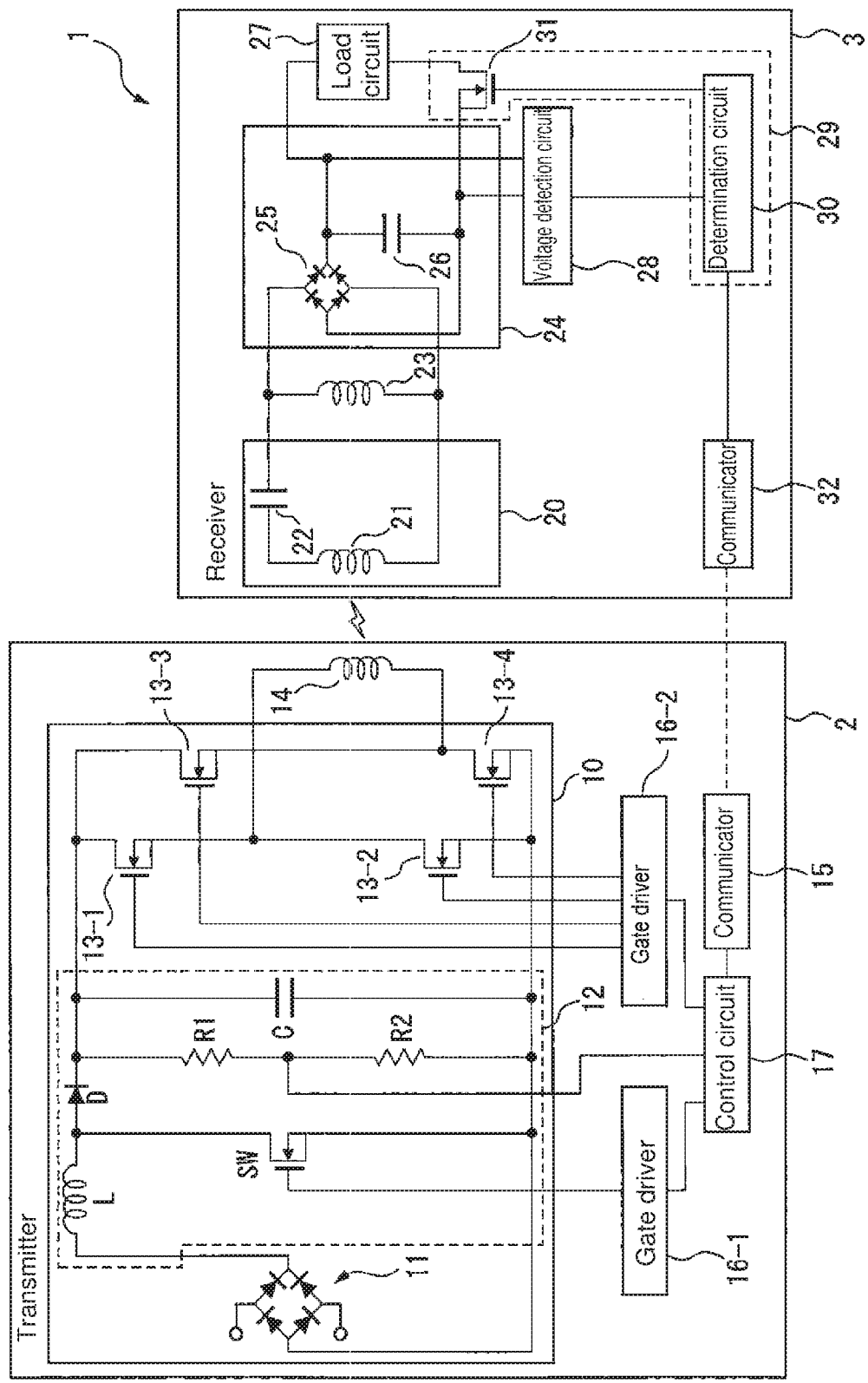
FIG. 1 is a schematic diagram of a contactless power transmission apparatus according to one embodiment of the present invention.

FIG. 1 is a schematic diagram of a contactless power transmission apparatus according to one embodiment of the present invention. As shown in FIG. 1, a contactless power transmission apparatus 1 includes a transmitter 2, and a receiver 3 for receiving power from the transmitter 2 through space in a contactless manner. The transmitter 2 includes a power supply circuit 10, a transmitter coil 14, a communicator 15, gate drivers 16-1 and 16-2, and a control circuit 17. The receiver 3 includes a resonant circuit 20 including a receiver coil 21 and a resonant capacitor 22, a coil 23, a rectifier-smoothing circuit 24, a load circuit 27, a voltage detection circuit 28, a constant voltage determination circuit 29, and a communicator 32. The contactless power transmission apparatus according to the present embodiment uses a topology referred to as a non-resonant-series with L (NSL) topology.

The transmitter 2 will now be described.

The power supply circuit 10 supplies AC power having an adjustable switching frequency and an adjustable voltage to the transmitter coil 14. The power supply circuit 10 thus includes a power source 11, a power factor correction circuit 12, and four switching elements 13-1 to 13-4.

The power source 11 supplies power having a predetermined pulsating voltage. The power source 11 is thus connected to a utility AC power source, and includes a full wave rectifier circuit for rectifying AC power supplied from the utility AC power source.

The power factor correction circuit 12 converts the voltage of power output from the power source 11 to a voltage controlled by the control circuit 17 and outputs the resultant voltage. The power factor correction circuit 12 thus includes, for example, a coil L and a diode D that are connected in series in this order from the positive electrode terminal of the power source 11, a switching element SW, which is an n-channel metal-oxide-semiconductor field-effect transistor (MOSFET) having a drain terminal connected between the coil L and the diode D and a source terminal connected to the negative electrode terminal of the power source 11, and a smoothing capacitor C connected in parallel to the switching element SW across the diode D. The switching element SW has a gate terminal connected to the gate driver 16-1. The power factor correction circuit 12 includes two resistors R1 and R2 connected in series between the positive electrode terminal and the negative electrode terminal of the power source 11. The resistors R1 and R2 are connected in parallel to the smoothing capacitor C between the diode D and the smoothing capacitor C. The voltage across the resistors R1 and R2 is measured by the control circuit 17 as a voltage output from the diode D.

The gate driver 16-1 controls the on-off state of the switching element SW in accordance with a duty ratio indicated by the control circuit 17 to allow the current output from the diode D to have the same waveform as the voltage supplied from the power source 11. The power factor correction circuit 12 thus performs power factor correction. As the duty ratio causing the on state of the switching element SW is higher, the diode D outputs a higher voltage.

The voltage output from the diode D is smoothed by the smoothing capacitor C and supplied to the transmitter coil 14 through the four switching elements 13-1 to 13-4.

The power factor correction circuit 12 is not limited to the above structure and may have another structure to output a voltage adjustable as controlled by the control circuit 17.

The four switching elements 13-1 to 13-4 are, for example, n-channel MOSFETs. Of the four switching elements 13-1 to 13-4, the switching elements 13-1 and 13-2 are connected in series between the positive electrode terminal and the negative electrode terminal of the power source 11 through the power factor correction circuit 12. In the present embodiment, the power source 11 has the positive electrode connected to the switching element 13-1 and the negative electrode connected to the switching element 13-2. The switching element 13-1 has a drain terminal connected to the positive electrode terminal of the power source 11 through the power factor correction circuit 12 and a source terminal connected to the drain terminal of the switching element 13-2. The switching element 13-2 has a source terminal connected to the negative electrode terminal of the power source 11 through the power factor correction circuit 12. The source terminal of the switching element 13-1 and the drain terminal of the switching element 13-2 are connected to one end of the transmitter coil 14, and the source terminal of the switching element 13-2 is connected to the other end of the transmitter coil 14 through the switching element 13-4.

Of the four switching elements 13-1 to 13-4, similarly, the switching elements 13-3 and 13-4 are connected in parallel to the switching elements 13-1 and 13-2 and in series to each other between the positive electrode terminal and the negative electrode terminal of the power source 11 through the power factor correction circuit 12. The power source 11 has the positive electrode connected to the switching element 13-3 and the negative electrode connected to the switching element 13-4. The switching element 13-3 has a drain terminal connected to the positive electrode terminal of the power source 11 through the power factor correction circuit 12 and a source terminal connected to the drain terminal of the switching element 13-4. The switching element 13-4 has a source terminal connected to the negative electrode terminal of the power source 11 through the power factor correction circuit 12. The source terminal of the switching element 13-3 and the drain terminal of the switching element 13-4 are connected to the other end of the transmitter coil 14.

The switching elements 13-1 to 13-4 have their gate terminals connected to the control circuit 17 through the gate driver 16-2. Each of the switching elements 13-1 to 13-4 may have its gate terminal connected to its source terminal through a resistor to be reliably turned on in response to a voltage for turning on the switching element. The switching elements 13-1 to 13-4 are turned on and off in response to a control signal from the control circuit 17 at an adjustable switching frequency. In the present embodiment, a pair of the switching elements 13-1 and 13-4 and a pair of the switching elements 13-2 and 13-3 are alternately turned on and off to allow the switching elements 13-2 and 13-3 to be off while the switching elements 13-1 and 13-4 are on, and the switching elements 13-1 and 13-4 to be off while the switching elements 13-2 and 13-3 are on. This allows direct current (DC) power supplied from the power source 11 through the power factor correction circuit 12 to be converted into AC power with the switching frequency of the switching elements and supplied to the transmitter coil 14.

The transmitter coil 14 transmits, through space, AC power supplied from the power supply circuit 10 to the resonant circuit 20 in the receiver 3.

The transmitter 2 in the present embodiment includes no capacitor connected in series or parallel to the transmitter coil 14, unlike a contactless power transmission apparatus using the SS topology. The contactless power transmission apparatus 1 according to the present embodiment thus does not use resonance in the transmitter. More specifically, the transmitter coil 14 receives AC power having a switching frequency at which the transmitter coil 14 does not resonate. The transmitter 2 can thus reduce Joule losses resulting from an increase in a current flowing through the transmitter coil 14.

The communicator 15, which is an example of a first communicator, extracts, from every radio signal received from the communicator 32 in the receiver 3, determination information indicating, for example, whether the contactless power transmission apparatus 1 is in a constant voltage output operation, and outputs the information to the control circuit 17. The communicator 15 thus includes, for example, an antenna that receives a radio signal in accordance with a predetermined wireless communication standard and a communication circuit that demodulates the radio signal. The predetermined wireless communication standard is, for example, ISO/IEC 15693, ZigBee (registered trademark), or Bluetooth (registered trademark).

The gate driver 16-1 receives, from the control circuit 17, a control signal for turning on and off the switching element SW in the power factor correction circuit 12, and changes a voltage applied to the gate terminal of the switching element SW in response to the control signal. More specifically, when receiving a control signal for turning on the switching element SW, the gate driver 16-1 applies a relatively high voltage to the gate terminal of the switching element SW to turn on the switching element SW. When receiving a control signal for turning off the switching element SW, the gate driver 16-1 applies a relatively low voltage to the gate terminal of the switching element SW to turn off the switching element SW. This allows the gate driver 16-1 to turn on and off the switching element SW in the power factor correction circuit 12 at timing specified by the control circuit 17.

The gate driver 16-2 receives a control signal for turning on and off each of the switching elements 13-1 to 13-4 from the control circuit 17, and changes the voltage applied to the gate terminal of each of the switching elements 13-1 to 13-4 in response to the control signal. More specifically, when receiving a control signal for turning on the switching elements 13-1 and 13-4, the gate driver 16-2 applies a relatively high voltage to the gate terminals of the switching elements 13-1 and 13-4 to turn on the switching elements 13-1 and 13-4. This allows a current from the power source 11 to flow through the switching element 13-1, the transmitter coil 14, and the switching element 13-4. When receiving a control signal for turning off the switching elements 13-1 and 13-4, the gate driver 16-2 applies a relatively low voltage to the gate terminals of the switching elements 13-1 and 13-4 to turn off the switching elements 13-1 and 13-4 and to prevent the current from the power source 11 from flowing through the switching elements 13-1 and 13-4. The gate driver 16-2 controls a voltage applied to the gate terminals of the switching elements 13-2 and 13-3 in the same manner. When the switching elements 13-1 and 13-4 are off and the switching elements 13-2 and 13-3 are on, the current from the power source 11 flows through the switching element 13-3, the transmitter coil 14, and the switching element 13-2.

The control circuit 17 includes, for example, nonvolatile and volatile memory circuits, an arithmetic circuit, and an interface circuit for connection to another circuit. Upon every reception of determination information from the communicator 15, the control circuit 17 controls the switching frequency and the voltage of AC power supplied from the power supply circuit 10 to the transmitter coil 14 in accordance with the determination information.

In the present embodiment, the control circuit 17 controls the pair of switching elements 13-1 and 13-4 and the pair of switching elements 13-2 and 13-3 to be alternately turned on for the same duration within one cycle corresponding to the switching frequency. To prevent the pair of switching elements 13-1 and 13-4 and the pair of switching elements 13-2 and 13-3 from being turned on at the same time and short-circuiting the power source 11, the control circuit 17 may provide dead time during which both the pairs of switching elements are off between the on and off states.

The control circuit 17 selects a duty ratio corresponding to a switching frequency by referring to a reference table indicating the correspondence between each switching frequency and the duty ratio for controlling the on-off state of the switching element SW in the power factor correction circuit 12 to enable a constant voltage output at the corresponding switching frequency for a voltage applied to the transmitter coil 14. The control circuit 17 determines the timing of turning on and off the switching element SW in accordance with the duty ratio and the change in the output voltage from the diode D in the power factor correction circuit 12, and outputs a control signal indicating the timing to the gate driver 16-1.

When the communicator 15 receives no radio signal from the receiver 3, the receiver 3 may be located outside the range for receiving power from the transmitter 2, or in other words, the transmitter 2 may be in a standby state. In this case, the control circuit 17 may set the duty ratio for controlling the on-off state of the switching element SW to its minimum possible value. In another case, the control circuit 17 may control the power supply circuit 10 in a burst mode, or more specifically, repeats the cycle of controlling the power supply circuit 10 to operate at a predetermined duty ratio for controlling the on-off state of the switching element SW for a relatively short predetermined duration (e.g., several seconds) and then to stop supplying power to the transmitter coil 14 by retaining the off state of each switching element for a relatively long duration (e.g., several minutes). During the standby state of the transmitter 2, the minimum possible voltage is applied to the transmitter coil 14 to reduce energy loss.

The control of the switching frequency and the voltage applied to the transmitter coil 14 performed by the control circuit 17 will be described in detail later.

The receiver 3 will now be described.

The resonant circuit 20 is an LC resonant circuit including the receiver coil 21 and the resonant capacitor 22 connected in series. The receiver coil 21 in the resonant circuit 20 has one end connected to one input terminal of the rectifier-smoothing circuit 24 through the resonant capacitor 22 and the other end connected to the other input terminal of the rectifier-smoothing circuit 24.

The receiver coil 21 resonates with an AC flowing through the transmitter coil 14 in the transmitter 2 together with the resonant capacitor 22 to receive power from the transmitter coil 14. The receiver coil 21 outputs the received power to the rectifier-smoothing circuit 24 through the resonant capacitor 22. The receiver coil 21 and the transmitter coil 14 in the transmitter 2 may have the same number or different numbers of turns.

The resonant capacitor 22 has one end connected to one end of the receiver coil 21 and the other end connected to one end of the coil 23 and to one input terminal of the rectifier-smoothing circuit 24. The resonant capacitor 22 resonates with the received power together with the receiver coil 21 and outputs the received power to the rectifier-smoothing circuit 24.

The coil 23 is connected between the resonant circuit 20 and the rectifier-smoothing circuit 24. In the present embodiment, the coil 23 has one end connected to the resonant capacitor 22 in the resonant circuit 20 and to one input terminal of the rectifier-smoothing circuit 24 and the other end connected to the receiver coil 21 and to the other input terminal of the rectifier-smoothing circuit 24 to be in parallel to the resonant circuit 20, or in this example, in parallel to the receiver coil 21. The coil 23 reduces the parasitic capacitance of diodes included in the rectifier-smoothing circuit 24 affecting the resonance with the transmitted power.

The rectifier-smoothing circuit 24, which is an example of a rectifier circuit, includes a full wave rectifier circuit 25 including four bridge-connected diodes and a smoothing capacitor 26. The rectifier-smoothing circuit 24 rectifies and smooths the power received through the resonant circuit 20 to convert the power to DC power. The rectifier-smoothing circuit 24 outputs the resultant DC power to the load circuit 27.

The voltage detection circuit 28 measures the output voltage across the rectifier-smoothing circuit 24 at predetermined intervals. The output voltage across the rectifier-smoothing circuit 24 corresponds to the output voltage of the resonant circuit 20. The measurement value of the output voltage across the rectifier-smoothing circuit 24 thus indirectly represents the measurement value of the output voltage of the resonant circuit 20. The voltage detection circuit 28 may be any of known voltage detection circuits that can detect a DC voltage. The voltage detection circuit 28 outputs a voltage detection signal representing the measurement value of the output voltage to the constant voltage determination circuit 29.

The constant voltage determination circuit 29 determines, based on the measurement value of the output voltage received from the voltage detection circuit 28, whether the contactless power transmission apparatus 1 is in a constant voltage output operation and whether the measurement value of the output voltage is within a range of allowable voltages during a constant voltage output operation. The constant voltage determination circuit 29 provides the determination result to the communicator 32. The constant voltage determination circuit 29 thus includes a determination circuit 30 that includes, for example, a memory circuit that stores the allowable range of voltages and an arithmetic circuit that compares the measurement value of the output voltage with the allowable range of voltages.

The constant voltage determination circuit 29 further includes a switching element 31, such as a MOSFET, connected between the rectifier-smoothing circuit 24 and the load circuit 27. The switching element 31 does not allow a current to flow from the rectifier-smoothing circuit 24 to the load circuit 27 in the off state (that is, the AC equivalent resistance Rac of the load circuit 27=∞) and allows a current to flow from the rectifier-smoothing circuit 24 to the load circuit 27 in the on state. The determination circuit 30 in the constant voltage determination circuit 29 turns on and off the switching element 31 at predetermined intervals while the measurement value of the output voltage is out of the allowable range of voltages. This changes the resistance of the entire circuit including the load circuit 27 connected to the rectifier-smoothing circuit 24 at the predetermined intervals. The determination circuit 30 can thus determine whether the contactless power transmission apparatus 1 is in a constant voltage output operation by determining whether the measurement value of the output voltage remains substantially constant while turning on and off the switching element 31. The determination circuit 30 provides, to the communicator 32, a notification indicating that the contactless power transmission apparatus 1 is in a constant voltage output operation when the measurement value of the output voltage remains substantially constant while turning on and off the switching element 31 at the predetermined intervals.

When the measurement value of the output voltage indicates that the contactless power transmission apparatus 1 is in a constant voltage output operation for a predetermined period longer than a predetermined interval, the determination circuit 30 stops turning on and off the switching element 31 and retains the on state. The determination circuit 30 determines whether the measurement value of the output voltage is within the allowable range of voltages and provides the determination result to the communicator 32.

When the measurement value of the output voltage is within the allowable range of voltages for a predetermined period longer than the predetermined interval, the determination circuit 30 provides, to the communicator 32, the determination result indicating that the contactless power transmission apparatus 1 is in a constant voltage output operation and the measurement value of the output voltage is within the allowable range of voltages.

In one modification, the constant voltage determination circuit 29 may include a resistor connected in parallel to the load circuit 27 to the rectifier-smoothing circuit 24. In this case, the switching element 31 may be connected in series to the resistor and in parallel to the load circuit 27. The determination circuit 30 turns off the switching element 31 while the measurement value of the output voltage is within the allowable range of voltages. When the measurement value of the output voltage is out of the allowable range of voltages, the determination circuit 30 turns on and off the switching element 31 at the predetermined intervals in the same manner as in the above embodiment. In this modification, the load circuit 27 continuously receives power while the contactless power transmission apparatus 1 is not in a constant voltage output operation.

In another modification, a second switching element, such as a MOSFET, may be connected in parallel to the above resistor and in series to the load circuit 27. In this case, while the measurement value of the output voltage is within the allowable range of voltages, the determination circuit 30 turns on the second switching element to supply power to the load circuit 27. When the measurement value of the output voltage is out of the allowable range of voltages, the determination circuit 30 may turn off the second switching element to stop supplying power to the load circuit 27. This structure prevents an excessively high voltage from being applied to the load circuit 27 although the voltage of received power rises excessively during adjustment of the switching frequency in the transmitter 2.

The communicator 32, which is an example of a second communicator, generates, in accordance with the determination result from the determination circuit 30 in the constant voltage determination circuit 29, a radio signal including determination information indicating whether the contactless power transmission apparatus 1 is in a constant voltage output operation and whether the measurement value of the output voltage is within the allowable range of voltages at predetermined intervals. The communicator 32 then transmits the radio signal toward the communicator 15 in the transmitter 2. The communicator 32 thus includes, for example, a communication circuit that generates a radio signal in accordance with a predetermined wireless communication standard and an antenna that outputs the radio signal. As in the communicator 15, the predetermined wireless communication standard is, for example, ISO/IEC 15693, ZigBee (registered trademark), or Bluetooth (registered trademark).

The contactless power transmission apparatus 1 reduces fluctuations in the output voltage in the manner described below.

Figure 2:
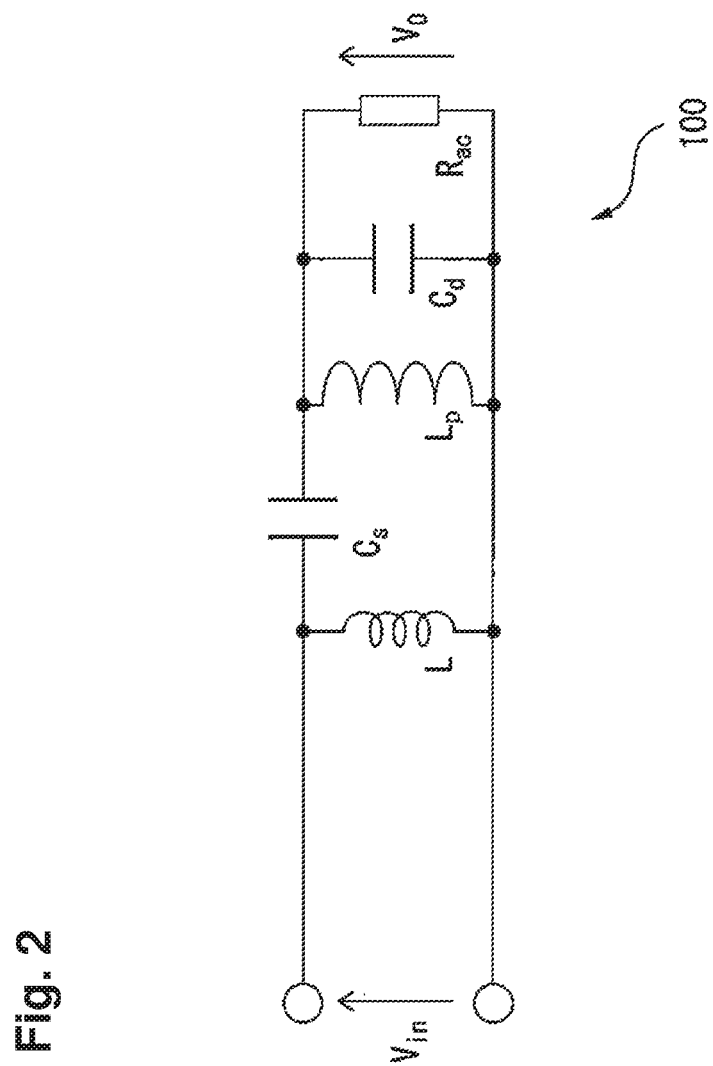
FIG. 2 is an equivalent circuit diagram of a receiver in the embodiment.

FIG. 2 is an equivalent circuit diagram of the receiver 3. In an equivalent circuit 100, L is the inductance of the receiver coil 21 in the resonant circuit 20, Cs is the capacitance of the resonant capacitor 22 connected in parallel to the receiver coil 21 in the resonant circuit 20 in the receiver 3, Lp is the inductance of the coil 23, and Cd is the parasitic capacitance of the diodes included in the rectifier-smoothing circuit 24. Typically, Cd<<Cs. Rac is the AC equivalent resistance of the load circuit 27 for a resistance Ro, and $Rac=(8/\pi^2)\times Ro$.

The power transmission efficiency in contactless power transmission varies in accordance with the degree of coupling k between a transmitter coil and a receiver coil and the quality (Q) factor, which is an index of resonance intensity. More specifically, as the degree of coupling k increases, the power factor approaches 1, thus improving power transmission efficiency. Also, as the Q factor increases, the power factor approaches 1, thus improving power transmission efficiency. As shown in the equivalent circuit 100, the receiver coil 21 and the parasitic capacitance Cd of the diodes in the rectifier-smoothing circuit 24 form a parallel connection, and thus together operate as an RLC parallel resonant circuit for the transmitted power. In this case, the RLC parallel resonant circuit formed by the receiver coil 21 and the parasitic capacitance Cd has the Q factor written with the formula below.

Formula 1

$$Q = Rac\sqrt{\frac{Cd}{L}} \quad (1)$$

Formula (1) shows that the Q factor increases as the AC equivalent resistance Rac of the load circuit 27 increases. Without the coil 23, the parasitic capacitance Cd affects the power transmission more directly as the AC equivalent resistance Rac of the load circuit 27 increases, thus causing more fluctuations in the output voltage.

In the present embodiment, the coil 23 is connected in parallel to each of the resonant circuit 20 and the rectifier-smoothing circuit 24. The coil 23 and the parasitic capacitance Cd together form a parallel resonant circuit, which generates an impedance. This impedance increases at a frequency nearer the resonance frequency determined by the product of the inductance Lp of the coil 23 and the parasitic capacitance Cd. At the resonance frequency, the impedance is infinity in theory. This reduces a current flowing through the parallel resonant circuit formed by the coil 23 and the parasitic capacitance Cd. The circuit in the receiver 3 can thus be approximate to a series resonant circuit formed by the receiver coil 21, the resonant capacitor 22, and the load circuit 27. At the resonance frequency of the series resonant circuit, the AC equivalent resistance Rac of the load circuit 27 is less likely to affect the Q factor. The output voltage approaches a value determined in accordance with the degree of coupling k and the voltage applied to the transmitter coil 14. This reduces an increase in the output voltage resulting from an increase in the AC equivalent resistance Rac of the load circuit 27. This thus reduces fluctuations in the output voltage resulting from fluctuations in the AC equivalent resistance Rac of the load circuit 27.

The operation of the contactless power transmission apparatus 1 will now be described in detail.

In the present embodiment, the control circuit 17 in the transmitter 2 controls, based on the determination information received through the communicator 15, the switching frequency and the voltage of AC power supplied to the transmitter coil 14 from the power supply circuit 10 to allow the contactless power transmission apparatus 1 to continue a constant voltage output operation.

Figure 3:
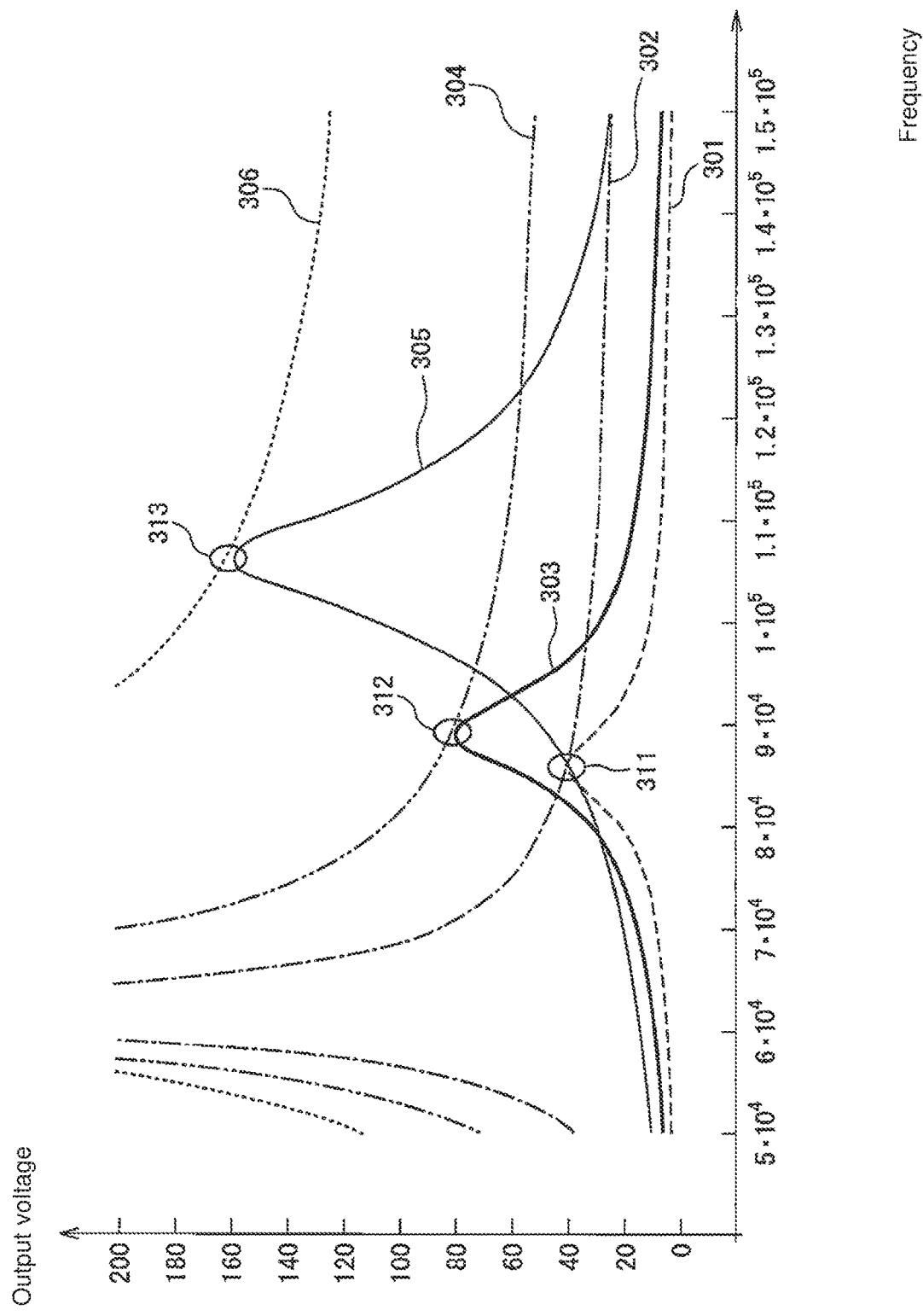
FIG. 3 is a graph showing example simulation results for the frequency response of the output voltage from the contactless power transmission apparatus according to the embodiment.

FIG. 3 is a graph showing example simulation results for the frequency response of the output voltage from the contactless power transmission apparatus 1 according to the present embodiment. In FIG. 3, the horizontal axis represents the frequency, and the vertical axis represents the output voltage. In the simulation, the transmitter coil 14 and the receiver coil 21 coupled to form an ideal transformer of 1:1. The transmitter coil 14 has an inductance L1 of 174 µH, the resonant capacitor 22 has a capacitance Cs of 20 nF, the transmitter has a coil resistance Ri of 0.1Ω, the receiver has a coil resistance Ris of 0.1Ω, the coil 23 has an inductance Lp of 160 µH, the diodes in the rectifier-smoothing circuit 24 have a parasitic capacitance Cd of 1 nF, the transmitter coil 14 receives a voltage Vin of 300 V, and the load circuit 27 has a resistance Ro of 10Ω (Rac≈8.1Ω). A line 301 represents the frequency response of the output voltage for the degree of coupling k=0.15 and the AC equivalent resistance of the load circuit 27 being Rac. A line 302 represents the frequency response of the output voltage for the degree of coupling k=0.15 and the AC equivalent resistance of the load circuit 27 being (100*Rac). A line 303 represents the frequency response of the output voltage for the degree of coupling k=0.3 and the AC equivalent resistance of the load circuit 27 being Rac. A line 304 represents the frequency response of the output voltage for the degree of coupling k=0.3 and the AC equivalent resistance of the load circuit 27 being (100*Rac). A line 305 represents the frequency response of the output voltage for the degree of coupling k=0.6 and the AC equivalent resistance of the load circuit 27 being Rac. A line 306 represents the frequency response of the output voltage for the degree of coupling k=0.6 and the AC equivalent resistance of the load circuit 27 being (100*Rac).

As shown in FIG. 3, the graph shows, for each degree of coupling k (at three plots 311 to 313 in the figure), the combination of the frequency and the output voltage that causes an output voltage to be substantially constant (or a constant voltage output) for any varying AC equivalent resistance Rac of the load circuit 27 under the constant degree of coupling k. This reveals that the contactless power transmission apparatus 1 can perform a constant voltage output operation for any varying resistance of the load circuit 27. Further, although the output voltage being constant for any varying AC equivalent resistance Rac of the load circuit 27 differs depending on the degree of coupling as indicated at the plots 311 to 313, adjusting the voltage applied to the transmitter coil 14 can eliminate this difference in the output voltage and enable the output voltage to be substantially constant at any degree of coupling.

Figure 4:
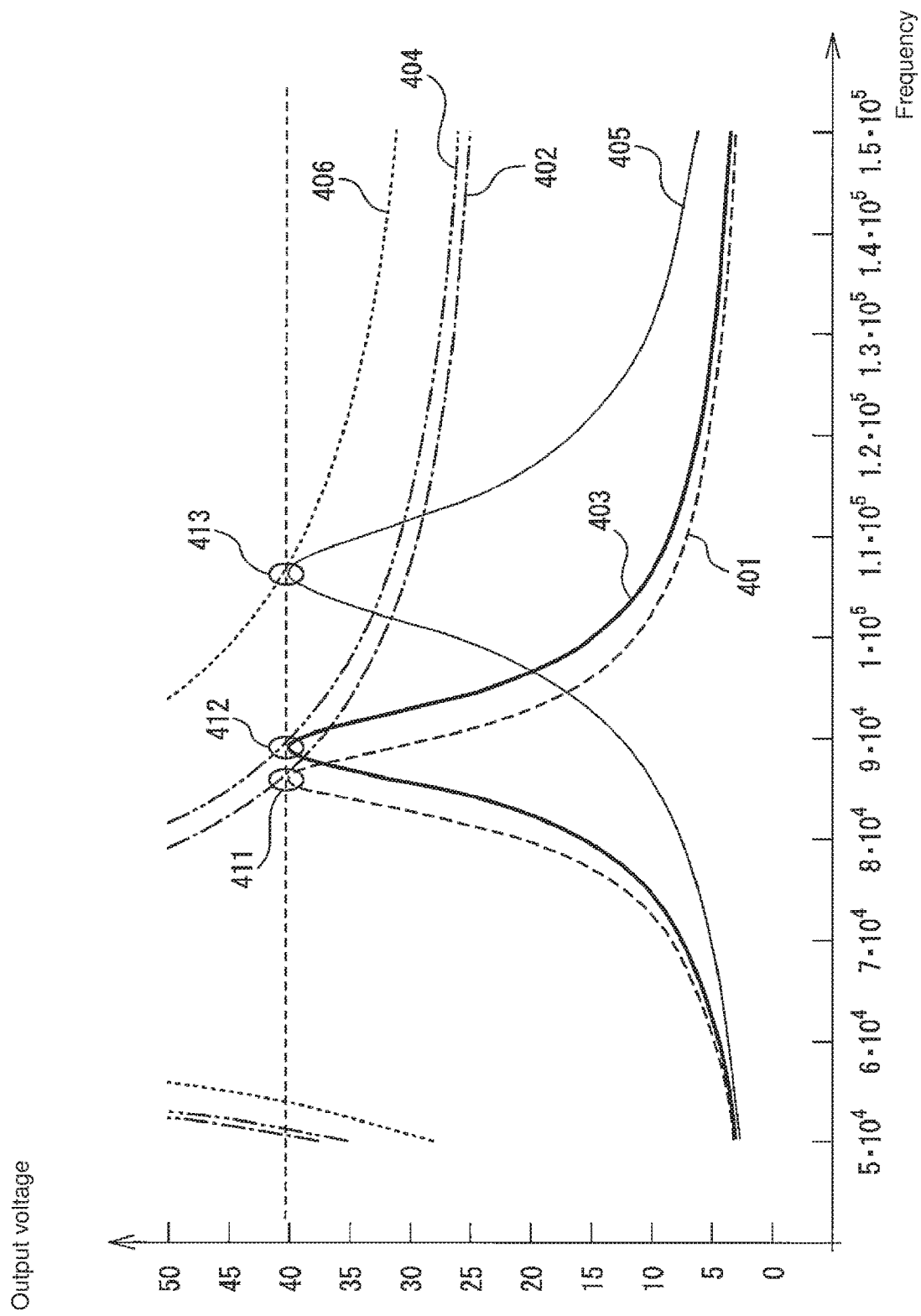
FIG. 4 is a graph showing example simulation results for the frequency response of the output voltage for a varying voltage applied to a transmitter coil in accordance with the degree of coupling in the simulation shown in FIG. 3.

FIG. 4 is a graph showing example simulation results for the frequency response of the output voltage for a varying voltage applied to the transmitter coil 14 in accordance with the degree of coupling in the simulation shown in FIG. 3. In FIG. 4, the horizontal axis represents the frequency, and the vertical axis represents the output voltage. A line 401 represents the frequency response of the output voltage for the degree of coupling k=0.15, the AC equivalent resistance of the load circuit 27 being Rac, and a voltage applied to the transmitter coil 14 being Vin. A line 402 represents the frequency response of the output voltage for the degree of coupling k=0.15, the AC equivalent resistance of the load circuit 27 being (100*Rac), and a voltage applied to the transmitter coil 14 being Vin. A line 403 represents the frequency response of the output voltage for the degree of coupling k=0.3, the AC equivalent resistance of the load circuit 27 being Rac, and the voltage applied to the transmitter coil 14 being (0.5*Vin). A line 404 represents the frequency response of the output voltage for the degree of coupling k=0.3, the AC equivalent resistance of the load circuit 27 being (100*Rac), and the voltage applied to the transmitter coil 14 being (0.5*Vin). A line 405 represents the frequency response of the output voltage for the degree of coupling k=0.6, the AC equivalent resistance of the load circuit 27 being Rac, and the voltage applied to the transmitter coil 14 being (0.25*Vin). A line 406 represents the frequency response of the output voltage for the degree of coupling k=0.6, the AC equivalent resistance of the load circuit 27 being (100*Rac), and the voltage applied to the transmitter coil 14 being (0.25*Vin).

The combinations of the frequency and the output voltage at three plots 411 to 413 correspond to the combinations at the plots 311 to 313 shown in FIG. 3 that cause an output voltage to be substantially constant (or a constant voltage output) in response to a varying AC equivalent resistance Rac of the load circuit 27 under the constant degree of coupling k. The output voltages at the plots 411 to 413 are substantially equal to one another.

This reveals that appropriately adjusting the switching frequency and the voltage of the AC power applied to the transmitter coil 14 enables the output voltage to remain substantially constant independently of the varying AC equivalent resistance Rac of the load circuit 27 or the varying degree of coupling k.

Figure 5:
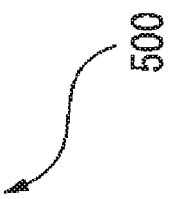
FIG. 5 is a table showing the relationship between the resistance of a load circuit and the output voltage for each degree of coupling in the simulation in FIG. 4 at a switching frequency enabling a constant voltage output operation.

FIG. 5 is a table showing the relationship between the resistance of the load circuit 27 and the output voltage at each of the plots 411 to 413. A table 500 shows, for each of the degrees of coupling k=0.15, 0.3, and 0.6, the output voltage for the AC equivalent resistance Rac of the load circuit 27 being substantially 8.1Ω (Ro=10Ω) and the output voltage for the AC equivalent resistance Rac being substantially 810Ω (Ro=1 kΩ). In the same manner as in the simulation in FIG. 4, the transmitter coil 14 receives a voltage Vin of 300 V for k=0.15, a voltage of (0.5*Vin) for k=0.3, and a voltage of (0.25*Vin) for k=0.6.

FIG. 6 is a table showing the relationship between the resistance of the load circuit 27 and the output voltage at each of plots 411 to 413 in a comparative example eliminating the coil 23. A table 600 shows, for each of the degrees of coupling k=0.15, 0.3, and 0.6, the output voltage for the AC equivalent resistance Rac of the load circuit 27 being substantially 8.1Ω and the output voltage for the AC equivalent resistance Rac being 810Ω. In the same manner as in the simulation in FIG. 4, the transmitter coil 14 receives a voltage Vin of 300 V for k=0.15, a voltage of (0.5*Vin) for k=0.3, and a voltage of (0.25*Vin) for k=0.6.

As revealed from the tables 500 and 600, the coil 23 can reduce fluctuations in the output voltage resulting from fluctuations in the resistance of the load circuit 27.

To enable such a constant voltage output operation, the control circuit 17 controls the switching frequency and the voltage of the AC power applied to the transmitter coil 14 in the manner described below.

When the determination information included in the radio signal received from the receiver 3 through the communicator 15 indicates that the contactless power transmission apparatus 1 is not in a constant voltage output operation, the control circuit 17 changes the switching frequency of the AC power within a predetermined frequency range. The predetermined frequency range ranges from the frequency at which a constant voltage is output with an estimated minimum degree of coupling between the transmitter coil 14 and the receiver coil 21 to the frequency at which a constant voltage is output with an estimated maximum degree of coupling between the transmitter coil 14 and the receiver coil 21 when, for example, the transmitter 2 transmits power to the receiver 3.

When changing the switching frequency, the control circuit 17 may increase or decrease the switching frequency sequentially from the lower limit to the upper limit of the predetermined frequency range or from the upper limit to the lower limit of the predetermined frequency range. To allow the constant voltage determination circuit 29 in the receiver 3 to determine whether the output voltage is substantially constant, the control circuit 17 may change the switching frequency in steps to retain the constant switching frequency for longer than the interval at which the determination circuit 30 in the constant voltage determination circuit 29 turns on and off the switching element 31.

The control circuit 17 may lower the voltage applied to the transmitter coil 14 to the lowest while adjusting the switching frequency. This prevents power with an excessively high voltage from being supplied to the receiver 3.

When the determination information included in the radio signal received from the receiver 3 through the communicator 15 indicates that the measurement value of the output voltage is out of the allowable range of voltages but remains substantially constant in response to a varying resistance of the load circuit, or more specifically, a constant voltage output operation is being performed, the control circuit 17 thereafter retains the constant switching frequency. The control circuit 17 selects the duty ratio by referring to the reference table indicating the correspondence between each switching frequency and the duty ratio that controls the on-off state of the switching element SW in the power factor correction circuit 12 to enable a constant voltage output at the corresponding switching frequency at any degree of coupling. The control circuit 17 controls the gate driver 16-1 to turn on and off the switching element SW in the power factor correction circuit 12 in accordance with the duty ratio. In this manner, the voltage applied to the transmitter coil 14 is adjusted to allow the output voltage from the resonant circuit 20 to be within the allowable range of voltages, or more specifically, to allow a constant voltage to be output at any degree of coupling. When the determination information included in the radio signal received from the receiver 3 through the communicator 15 indicates that the measurement value of the output voltage is within the allowable range of voltages, the control circuit 17 retains the constant switching frequency and the constant voltage of AC power supplied to the transmitter coil 14.

The control circuit 17 may gradually change the duty ratio until the determination information included in the radio signal received from the receiver 3 through the communicator 15 indicates that the measurement value of the output voltage is within the allowable range of voltages, instead of referring to the above reference table and selecting the duty ratio.

As described above, the contactless power transmission apparatus includes, in the receiver, the coil connected in parallel to the resonant circuit between the resonant circuit and the rectifier circuit. The contactless power transmission apparatus with this structure can reduce the parasitic capacitance of the diodes in the rectifier circuit affecting the power transmission and thus reduce fluctuations in the output voltage resulting from load fluctuations in the load circuit.

As shown in FIGS. 3 and 4, the switching frequency of AC power applied to the transmitter coil 14 for enabling a constant voltage output operation of the contactless power transmission apparatus 1 varies with the degree of coupling between the transmitter coil 14 and the receiver coil 21. The impedance of the LC parallel resonant circuit formed by the coil 23 and the parasitic capacitance of the diodes in the rectifier-smoothing circuit 24 also varies with the change in the switching frequency. To reduce fluctuations in the output voltage more effectively, the inductance of the coil 23 may thus also vary in accordance with the degree of coupling or the switching frequency of AC power applied to the transmitter coil 14.

Figure 7:
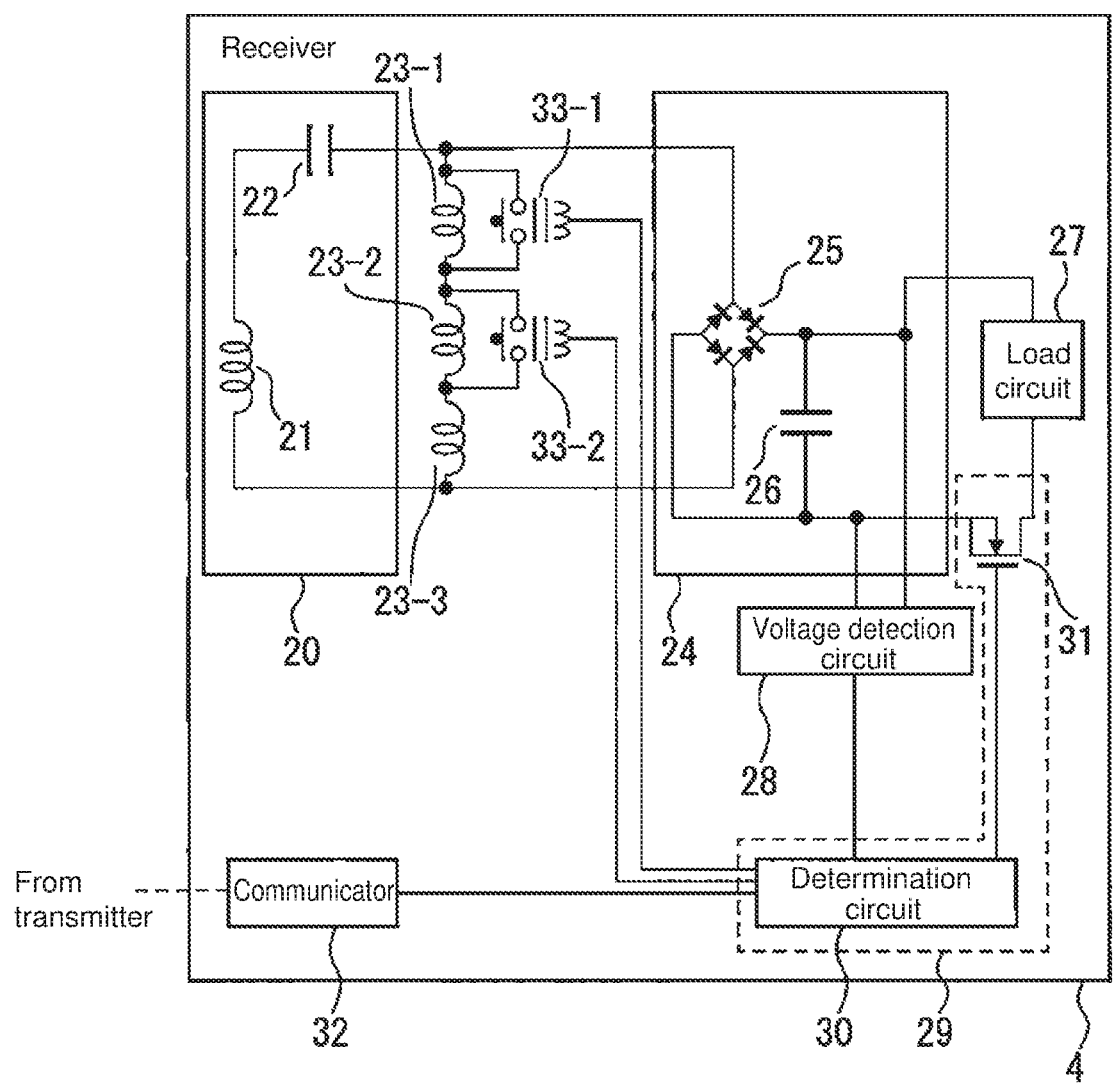
FIG. 7 is a schematic diagram of a receiver in a modification.

FIG. 7 is a schematic diagram of a receiver according to a modification. As shown in FIG. 7, a receiver 4 according to this modification includes a resonant circuit 20 including a receiver coil 21 and a resonant capacitor 22, three coils 23-1 to 23-3, a rectifier-smoothing circuit 24, a load circuit 27, a voltage detection circuit 28, a constant voltage determination circuit 29, a communicator 32, and two relays 33-1 and 33-2. The receiver 4, together with, for example, the transmitter 2 in the above embodiment, forms a contactless power transmission apparatus.

The receiver 4 in this modification differs from the receiver 3 in FIG. 1 in the three coils 23-1 to 23-3 between the resonant circuit 20 and the rectifier-smoothing circuit 24 and the two relays 33-1 and 33-2, and partly in the operations of the determination circuit 30 in the constant voltage determination circuit 29 and the communicator 32. The differences and associated portions will now be described. For the other components of the receiver 4, the corresponding components are described in the above embodiment.

The three coils 23-1 to 23-3 are connected in series to one another and in parallel to the resonant circuit 20 and to the rectifier-smoothing circuit 24 between the resonant circuit 20 and the rectifier-smoothing circuit 24. The coils 23-1 to 23-3 may have the same inductance or different inductances.

The two relays 33-1 and 33-2 each are an example of a short-circuiting circuit. The relay 33-1 is in parallel to the coil 23-1, and the relay 33-2 is in parallel to the coil 23-2. When turned on, the relay 33-1 short-circuits the coil 23-1. Similarly, the relay 33-2 short-circuits the coil 23-2 when turned on. The determination circuit 30 controls the on-off states of the relays 33-1 and 33-2. The relays 33-1 and 33-2 are turned on and off in the above manner to change the resonance frequency of the parallel resonant circuit formed by the coils 23-1 to 23-3 and the parasitic capacitance Cd of the diodes in the rectifier-smoothing circuit 24. More specifically, when the relay 33-1 and the relay 33-2 are both off, the resonance frequency of the parallel resonant circuit is determined by the product of the parasitic capacitance Cd and the sum of the inductances of the coils 23-1 to 23-3. When the relay 33-1 is off and the relay 33-2 is on, the resonance frequency of the parallel resonant circuit is determined by the product of the parasitic capacitance Cd and the sum of the inductances of the coils 23-1 and 23-3. When the relay 33-1 is on and the relay 33-2 is off, the resonance frequency of the parallel resonant circuit is determined by the product of the parasitic capacitance Cd and the sum of the inductances of the coils 23-2 and 23-3. When the relay 33-1 and the relay 33-2 are both on, the resonance frequency of the parallel resonant circuit is determined by the product of the parasitic capacitance Cd and the inductance of the coil 23-3. Thus, turning on and off the relays 33-1 and 33-2 can change, for the same frequency, the impedance of the parallel resonant circuit formed by the coils 23-1 to 23-3 and the parasitic capacitance Cd of the diodes in the rectifier-smoothing circuit 24.

In a constant voltage output operation of a contactless power transmission apparatus including the transmitter 2 shown in FIG. 1 and the receiver 4, the communicator 32 receives, from the communicator 15 in the transmitter 2, a radio signal including information indicating the switching frequency of AC power supplied to the transmitter coil 14 and provides the information to the determination circuit 30. When the determination information included in the radio signal received from the receiver 4 through the communicator 15 indicates that the measurement value of the output voltage is within the allowable range of voltages, the control circuit 17 in the transmitter 2 controls the communicator 15 to transmit a radio signal including the information indicating the switching frequency of AC power supplied to the transmitter coil 14.

The determination circuit 30 stores, in its nonvolatile semiconductor memory, a reference table including the correspondence between each switching frequency enabling a constant voltage output operation of the contactless power transmission apparatus and the on-off states of the relays 33-1 and 33-2. For the reference table, the on-off states of the relays 33-1 and 33-2 are predetermined by, for example, simulations or experiments to minimize fluctuations in the output voltage resulting from load fluctuations in the load circuit 27 at the corresponding switching frequency. For example, at higher switching frequencies, more relays are turned on to increase the resonance frequency of the parallel resonant circuit formed by the coils 23-1 to 23-3 and the parasitic capacitance Cd of the diodes in the rectifier-smoothing circuit 24. In a constant voltage output operation of the contactless power transmission, the determination circuit 30 receives, through the communicator 32 from the transmitter 2, the switching frequency of the AC power supplied to the transmitter coil 14 and refers to the reference table to determine the on-off state of each of the relays 33-1 and 33-2 for the received switching frequency. The determination circuit 30 controls the on-off states of the relays 33-1 and 33-2 in accordance with the determination.

The contactless power transmission apparatus according to the modification including the receiver 4 switches between short-circuiting and opening at least one of the coils connected between the resonant circuit and the rectifier-smoothing circuit in accordance with the switching frequency of AC power supplied to the transmitter coil during the constant voltage output operation, or more specifically, in accordance with the degree of coupling between the transmitter coil and the receiver coil. The contactless power transmission apparatus thus efficiently cancels the parasitic capacitance of the diodes in the rectifier-smoothing circuit affecting the transmitted power, thus more efficiently reducing fluctuations in the output voltage resulting from load fluctuations in the load circuit.

The coils 23-1 to 23-3 may be arranged in parallel to one another between the resonant circuit 20 and the rectifier-smoothing circuit 24. In this case as well, the parallel resonant circuit formed by the coils 23-1 to 23-3 and the parasitic capacitance Cd of the diodes in the rectifier-smoothing circuit 24 has a different impedance for the same frequency depending on whether the coils 23-1 and 23-2 are short-circuited. Thus, in the same manner as in the modification described above, the determination circuit 30 controls the on-off states of the relays 33-1 and 33-2 in accordance with the switching frequency enabling a constant voltage output operation of the contactless power transmission apparatus.

In another example, two coils or four or more coils, rather than three coils, may be connected in series or parallel to one another and also in parallel to the receiver coil 21 in the resonant circuit 20 and to the rectifier-smoothing circuit 24 between the resonant circuit 20 and the rectifier-smoothing circuit 24. The coils, except one of the coils, each are connected in parallel to a relay. In the same manner as in the modification described above, the determination circuit 30 controls the on-off states of the relays in accordance with the switching frequency enabling a constant voltage output operation of the contactless power transmission apparatus.

In another modification, the power supply circuit that supplies AC power to the transmitter coil in the transmitter may not have the circuit configuration described in the above embodiment or modifications, but may have another circuit configuration that can adjust the switching frequency and the voltage applied to the transmitter coil.

Figure 8A:
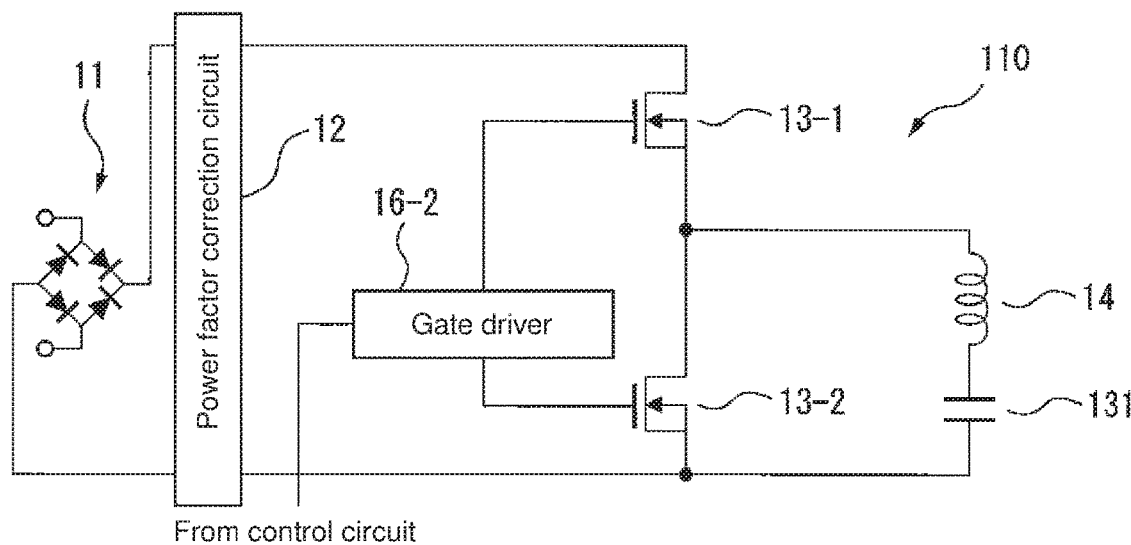
FIG. 8A is a circuit diagram of a power supply circuit in a modification.
Figure 8B:
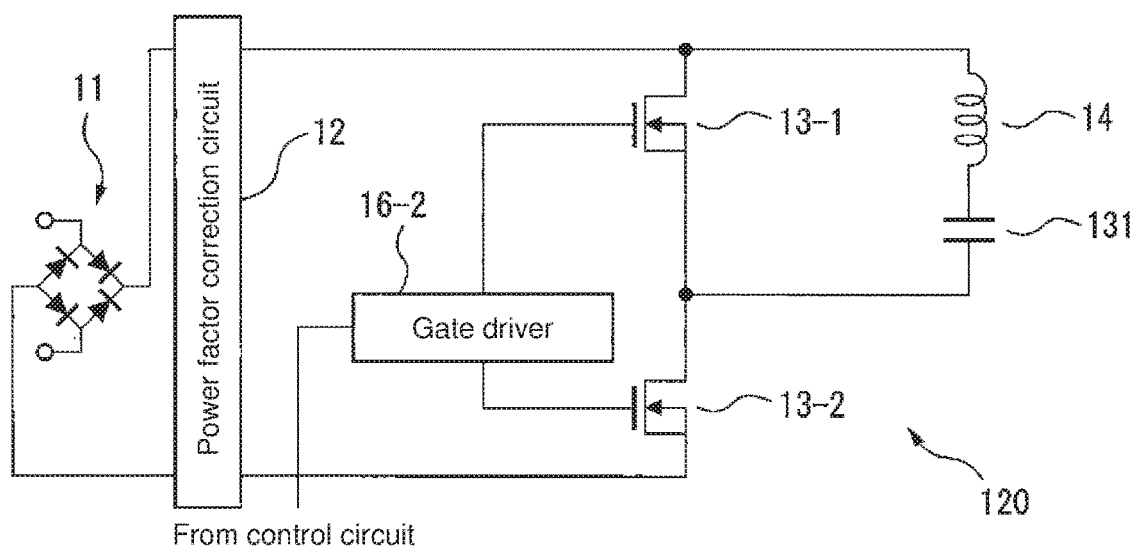
FIG. 8B is a circuit diagram of a power supply circuit in a modification.

FIGS. 8A and 8B each are a circuit diagram of a power supply circuit according to a modification.

A power supply circuit 110 shown in FIG. 8A includes a power source 11, a power factor correction circuit 12, two switching elements 13-1 and 13-2, and a capacitor 131 connected in series to a transmitter coil 14 and functioning as a DC breaker. In the present modification as well, each switching element may be, for example, an n-channel MOSFET. The power factor correction circuit 12 may be, for example, the same as the power factor correction circuit 12 in the above embodiment.

In the present modification, the switching elements 13-1 and 13-2 are connected in series between the positive electrode terminal and the negative electrode terminal of the power source 11. The power source 11 has the positive electrode connected to the switching element 13-1 and the negative electrode connected to the switching element 13-2. The switching element 13-1 has a drain terminal connected to the positive electrode terminal of the power source 11 through the power factor correction circuit 12 and a source terminal connected to the drain terminal of the switching element 13-2. The switching element 13-2 has a source terminal connected to the negative electrode terminal of the power source 11 through the power factor correction circuit 12. The source terminal of the switching element 13-1 and the drain terminal of the switching element 13-2 are connected to one end of the transmitter coil 14, and the source terminal of the switching element 13-2 is connected to the other end of the transmitter coil 14 through the capacitor 131. Each switching element has its gate terminal connected to the gate driver 16-2.

In the present modification, the gate driver 16-2 may alternately turn on and off the switching elements 13-1 and 13-2 in accordance with a control signal from a control circuit. More specifically, when the switching element 13-1 is on and the switching element 13-2 is off, a current flows through the power factor correction circuit 12 and the switching element 13-1 from the power source 11 to the transmitter coil 14 to charge the capacitor 131. When the switching element 13-1 is off and the switching element 13-2 is on, the capacitor 131 discharges and allows a current to flow through the transmitter coil 14 and the switching element 13-2 from the capacitor 131. In the present modification, the control circuit may thus control the switching frequency for turning on and off the switching elements 13-1 and 13-2 with the gate driver 16-2 in accordance with the determination information received from the receiver 3.

Similarly to the power supply circuit 110, a power supply circuit 120 shown in FIG. 8B includes a power source 11, a power factor correction circuit 12, two switching elements 13-1 and 13-2, and a capacitor 131 connected in series to a transmitter coil 14. The power supply circuit 120 differs from the power supply circuit 110 in that the transmitter coil 14 has one end connected to the positive electrode terminal of the power source 11 through the power factor correction circuit 12 and the other end connected to the source terminal of the switching element 13-1 and to the drain terminal of the switching element 13-2 through the capacitor 131.

In the present modification, the gate driver 16-2 may alternately turn on and off the switching elements 13-1 and 13-2 in accordance with a control signal from a control circuit.

To prevent the transmitter coil 14 and the capacitor 131 from operating as a resonant circuit in the adjustable switching frequency range in each of the power supply circuit 110 in FIG. 8A and the power supply circuit 120 in FIG. 8B, the capacitance of the capacitor 131 may be set to allow the transmitter coil 14 and the capacitor 131 to resonate at a frequency smaller than the resonance frequency of the resonant circuit in the receiver and smaller than the lower limit frequency in the adjustable switching frequency range.

In the embodiment shown in FIG. 1, a capacitor may be connected in series to the transmitter coil 14 to function as a DC breaker as in the power supply circuit 110 and in the power supply circuit 120. In this case as well, to prevent the transmitter coil 14 and the capacitor from operating as a resonant circuit in the adjustable switching frequency range, the capacitance of the capacitor may be set to allow the transmitter coil 14 and the capacitor to resonate at a frequency smaller than the resonance frequency of the resonant circuit 20 in the receiver 3 and smaller than the lower limit frequency in the adjustable switching frequency range.

The communicator 15 in the transmitter 2 and the communicator 32 in the receiver 3 may be connectable with a wire and may each include a communication circuit that transmits and receives a signal including the determination information through the wire.

The rectifier circuit included in the receiver in each of the embodiment and the modifications described above may be a synchronous rectifier circuit.

As described above, those skilled in the art can make various changes in accordance with embodiments implemented within the scope of the present invention.

The invention claimed is:

1. A contactless power transmission apparatus, comprising:
    a transmitter; and
    a receiver configured to receive electric power from the transmitter in a contactless manner, wherein
    the transmitter comprises
        a transmitter coil configured to supply electric power to the receiver, and
        a power supply circuit configured to supply alternating current power to the transmitter coil, and
    the receiver comprises
        a resonant circuit comprising a receiver coil configured to receive electric power from the transmitter and a resonant capacitor connected in series to the receiver coil,
        a rectifier circuit configured to rectify electric power output from the resonant circuit, and
        a first coil connected in parallel to the resonant circuit between the resonant circuit and the rectifier circuit,
    the power supply circuit adjusts a switching frequency and a voltage of alternating current power supplied to the transmitter coil,
    the transmitter further comprises
        a first communicator configured to receive, from the receiver, a signal comprising determination information indicating whether the contactless power transmission apparatus is in a constant voltage output operation and whether a measurement value of an output voltage of the resonant circuit is within a predetermined allowable range of voltages, and
        a control circuit configured to control, in accordance with the determination information, the switching frequency and the voltage of the alternating current power supplied to the transmitter coil from the power supply circuit, and
    the receiver further comprises
        a voltage detection circuit configured to measure the output voltage of electric power output from the resonant circuit and determine the measurement value of the output voltage,
        a constant voltage determination circuit configured to determine, based on the measurement value of the output voltage, whether the contactless power transmission apparatus is in the constant voltage output operation and whether the measurement value of the output voltage of the resonant circuit is within the predetermined allowable range of voltages, and a second communicator configured to transmit the signal comprising the determination information to the transmitter.

2. The contactless power transmission apparatus according to claim 1, wherein the control circuit controls, in response to the determination information indicating that the contactless power transmission apparatus is not in the constant voltage output operation, the switching frequency of the alternating current power supplied to the transmitter coil from the power supply circuit to allow the measurement value of the output voltage to be unchanged for a varying resistance of a load circuit connected to the rectifier circuit in the receiver.

3. The contactless power transmission apparatus according to claim 2, wherein the control circuit controls the voltage of the alternating current power supplied to the transmitter coil from the power supply circuit to cause the measurement value of the output voltage of the resonant circuit to be within the predetermined allowable range of voltages in response to the determination information indicating that the contactless power transmission apparatus is in the constant voltage output operation and the measurement value of the output voltage of the resonant circuit is out of the predetermined allowable range of voltages.

4. The contactless power transmission apparatus according to claim 1, wherein the receiver further comprises
a second coil connected in parallel to the resonant circuit between the resonant circuit and the rectifier circuit, and
a short-circuiting circuit switchable between short-circuiting or opening the second coil, and the constant voltage determination circuit receives, from the transmitter through the second communicator, the switching frequency of the alternating current power supplied to the transmitter coil from the power supply circuit in response to the contactless power transmission apparatus being in the constant voltage output operation, and controlling the short-circuiting circuit in accordance with the switching frequency.

* * * * *